US011227578B2

(12) United States Patent
Chae et al.

(10) Patent No.: US 11,227,578 B2
(45) Date of Patent: Jan. 18, 2022

(54) SPEECH SYNTHESIZER USING ARTIFICIAL INTELLIGENCE, METHOD OF OPERATING SPEECH SYNTHESIZER AND COMPUTER-READABLE RECORDING MEDIUM

(71) Applicant: LG ELECTRONICS INC., Seoul (KR)

(72) Inventors: Jonghoon Chae, Seoul (KR); Sungmin Han, Seoul (KR)

(73) Assignee: LG ELECTRONICS INC., Seoul (KR)

(*) Notice: Subject to any disclaimer, the term of this patent is extended or adjusted under 35 U.S.C. 154(b) by 252 days.

(21) Appl. No.: 16/499,755

(22) PCT Filed: May 15, 2019

(86) PCT No.: PCT/KR2019/005814
§ 371 (c)(1),
(2) Date: Sep. 30, 2019

(87) PCT Pub. No.: WO2020/230924
PCT Pub. Date: Nov. 19, 2020

(65) Prior Publication Data
US 2021/0327405 A1    Oct. 21, 2021

(51) Int. Cl.
*G10L 13/02* (2013.01)
*G06N 3/08* (2006.01)
(Continued)

(52) U.S. Cl.
CPC .............. *G10L 13/02* (2013.01); *G06N 3/08* (2013.01); *G10L 13/08* (2013.01); *G10L 25/30* (2013.01)

(58) Field of Classification Search
CPC .......... G06N 3/08; G10L 25/30; G10L 19/018
(Continued)

(56) References Cited

U.S. PATENT DOCUMENTS 5,652,828 A * 7/1997 Silverman ............... G10L 13/10
704/258
2003/0135356 A1 * 7/2003 Ying ..................... G06F 40/211
704/1
(Continued)

FOREIGN PATENT DOCUMENTS

KR         100499116       7/2005
KR       1020100072962     7/2010
(Continued)

OTHER PUBLICATIONS

PCT International Application No. PCT/KR2019/005814, Written Opinion of the International Searching Authority dated Feb. 12, 2020, 7 pages.

*Primary Examiner* — Jesse S Pullias
(74) *Attorney, Agent, or Firm* — Lee, Hong, Degerman, Kang & Waimey PC

(57) ABSTRACT

A speech synthesizer using artificial intelligence includes a memory configured to store a first ratio of a word classified into a minor class among a plurality of classes and a synthesized speech model, and a processor configured to determine a class classification probability set of the word using the word, the first ratio and the synthesized speech model. The first ratio indicates a ratio in which the word is classified into the minor class within a plurality of characters, the plurality of classes includes a first class corresponding to first reading break, a second class corresponding to second reading break greater than the first break and a third class corresponding to third reading break greater than the second break, and the minor class has a smallest count among the first to third classes.

15 Claims, 11 Drawing Sheets

(51) Int. Cl.
*G10L 13/08* (2013.01)
*G10L 25/30* (2013.01)

(58) Field of Classification Search
USPC .................................................. 704/257–275
See application file for complete search history.

(56) References Cited

U.S. PATENT DOCUMENTS

| | | | |
|---|---|---|---|
| 2005/0114137 A1* | 5/2005 | Saito | G10L 13/10 |
| | | | 704/260 |
| 2016/0329043 A1* | 11/2016 | Kim | G06F 3/167 |
| 2018/0122361 A1* | 5/2018 | Silveira Ocampo | |
| | | | G10L 13/0335 |
| 2018/0166065 A1* | 6/2018 | Kepner | A63F 13/87 |
| 2018/0336882 A1 | 11/2018 | Reber et al. | |

FOREIGN PATENT DOCUMENTS

| | | |
|---|---|---|
| KR | 1020150087023 | 7/2015 |
| KR | 1020170017545 | 2/2017 |

* cited by examiner

FIG. 5

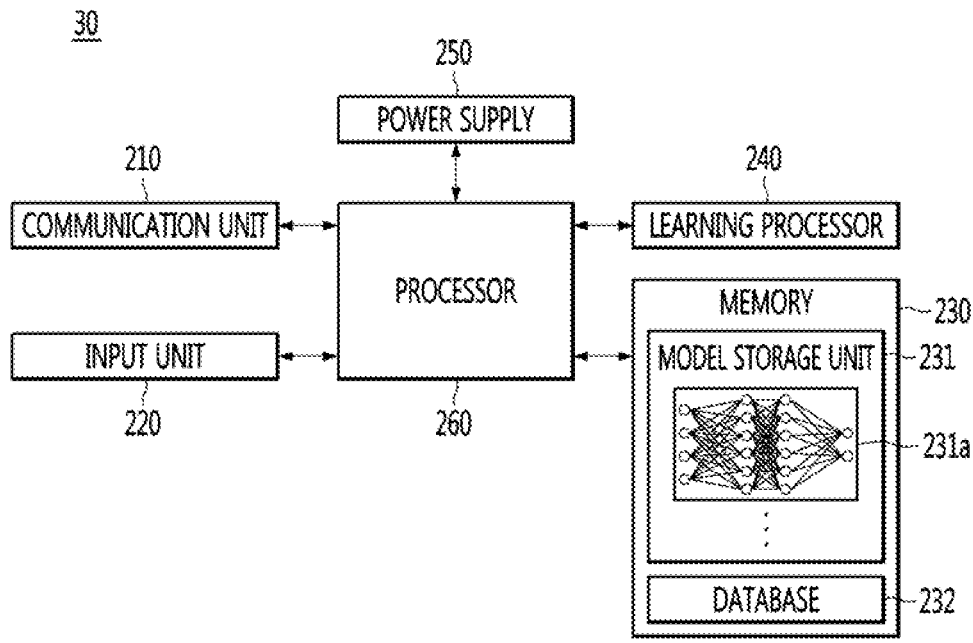

The / South Korean / government's // first artificial / rain / experiment / this year // over / the / Yellow Sea / failed to / induce / rain // the Korea / Meteorological / Administration / said Monday // with / Experiments / planned / throughout / the / year.

| Class | Description | Count |
|---|---|---|
| Word Phrase | WORD PHRASE: WITHOUT SPACING | 7 |
| Accentual Phrase | ACCENTUAL PHRASE: WITH SMALL SPACING | 19 |
| Intonation Phrase | INTONATION PHRAASE: WITH LARGE SPACING | 4 |

→ Class Imbalance

< 10000 SENTENCES STORED IN DATABASE>

| WORD | NON-IP FREQUENCY NUMBER | IP FREQUENCY NUMBER | RELATIVE RATIO | OVERSAMPLING RATE(%) |
|---|---|---|---|---|
| but | 10 | 60 | 1:6 | 60 |
| can | 120 | 30 | 4:1 | 25 |
| when | 25 | 50 | 1:2 | 20 |
| however | 10 | 40 | 1:4 | 40 |

1600

| Word | IP RATIO | NON-IP RATIO |
|---|---|---|
| Beacause | 0.84 | 0.16 |
| For | 0.79 | 0.21 |
| We | 0.78 | 0.22 |
| And | 0.78 | 0.22 |
| This | 0.15 | 0.85 |

1700

| Word | IP RATIO | WP RATIO | AP RATIO |
|---|---|---|---|
| Beacause | 0.84 | 0.1 | 0.06 |
| For | 0.79 | 0.11 | 0.1 |
| We | 0.78 | 0.05 | 0.17 |
| And | 0.78 | 0.06 | 0.16 |
| This | 0.15 | 0.7 | 0.15 |

| Beacause | PROBABILITY |
|---|---|
| PROBABILITY THAT WORD IS CLASSIFIED INTO WP CLASS | 0.3 |
| PROBABILITY THAT WORD IS CLASSIFIED INTO AP CLASS | 0.6 |
| PROBABILITY THAT WORD IS CLASSIFIED INTO IP CLASS | 0.1 |

| This | PROBABILITY |
|---|---|
| PROBABILITY THAT WORD IS CLASSIFIED INTO WP CLASS | 0.3 |
| PROBABILITY THAT WORD IS CLASSIFIED INTO AP CLASS | 0.3 |
| PROBABILITY THAT WORD IS CLASSIFIED INTO IP CLASS | 0.4 |

SPEECH SYNTHESIZER USING ARTIFICIAL INTELLIGENCE, METHOD OF OPERATING SPEECH SYNTHESIZER AND COMPUTER-READABLE RECORDING MEDIUM

CROSS-REFERENCE TO RELATED APPLICATIONS

This application is the National Stage filing under 35 U.S.C. 371 of International Application No. PCT/KR2019/005814, filed on May 15, 2019, the contents of which are hereby incorporated by reference herein its entirety.

TECHNICAL FIELD

The present invention relates to a speech synthesizer and, more particularly, to a speech synthesizer capable of improving reading break prediction performance.

BACKGROUND ART

Competition for speech recognition technology which has started in smartphones is expected to become fiercer in the home with diffusion of the Internet of things (IoT).

In particular, an artificial intelligence (AI) device capable of issuing a command using speech and having a talk is noteworthy.

A speech recognition service has a structure for selecting an optimal answer to a user's question using a vast amount of database.

A speech search function refers to a method of converting input speech data into text in a cloud server, analyzing the text and retransmitting a real-time search result to a device.

The cloud server has a computing capability capable of dividing a large number of words into speech data according to gender, age and intonation and storing and processing the speech data in real time.

As more speech data is accumulated, speech recognition will be accurate, thereby achieving human parity.

Recently, services for providing a synthesized speech in specific speaker's voice using a synthesized speech model have appeared.

For reading break learning of the synthesized speech model, a training set including one sentence (training data) and labeling data for labeling words configuring the sentence with reading break is required.

The reading break may be classified into first reading break, second reading break greater than the first reading break and third reading break greater than the second reading break.

When data having imbalance such as the count of specific reading break less than that of other reading break is used upon outputting the synthesized speech of one sentence, performance of the synthesized speech model may deteriorate.

When the performance of the synthesized speech model deteriorates, reading with break becomes unnatural upon outputting the synthesized speech, such that users may feel uncomfortable when listening to the synthesized speech.

DISCLOSURE

Technical Problem

An object of the present invention is to solve the above-described problem and the other problems.

Another object of the present invention is to provide a speech synthesizer capable of improving reading break prediction performance using artificial intelligence when a synthesized speech is output.

Technical Solution

A speech synthesizer using artificial intelligence according to an embodiment of the present invention includes a memory configured to store a first ratio of a word classified into a minor class among a plurality of classes and a synthesized speech model, and a processor configured to determine a class classification probability set of the word using the word, the first ratio and the synthesized speech model. The first ratio indicates a ratio in which the word is classified into the minor class within a plurality of characters, the plurality of classes includes a first class corresponding to first reading break, a second class corresponding to second reading break greater than the first break and a third class corresponding to third reading break greater than the second break, and the minor class has a smallest count among the first to third classes.

A method of operating a speech synthesizer using artificial intelligence according to another embodiment of the present invention includes storing a first ratio of a word classified into a minor class among a plurality of classes and a synthesized speech model, and determining a class classification probability set of the word using the word, the first ratio and the synthesized speech model. The first ratio indicates a ratio in which the word is classified into the minor class within a plurality of characters, the plurality of classes includes a first class corresponding to first reading break, a second class corresponding to second reading break greater than the first break and a third class corresponding to third reading break greater than the second break, the minor class has a smallest count among the first to third classes, and the class classification probability set includes a probability that the word is classified into the first class, a probability that the word is classified into the second class and a probability that the word is classified into the third class.

Advantageous Effects

According to the embodiment of the present invention, as performance of a synthesized speech model is improved, it is possible to naturally output a synthesized speech. Therefore, a listener may not feel uncomfortable when listening to the synthesized speech.

According to the embodiment of the present invention, it is possible to solve imbalance of training data of a synthesized speech model and to further improve performance of the synthesized speech model.

DESCRIPTION OF DRAWINGS

FIG. 5 is a block diagram illustrating the configuration of a speech synthesis server according to an embodiment of the present invention.

FIGS. 6 and 7 are views illustrating a class imbalance problem when reading break is predicted through a conventional synthesized speech.

FIGS. 20 and 21 are diagrams showing an example of a class classification probability set of a word output according to the synthesized speech model of FIG. 19.

BEST MODE

Figure 1:
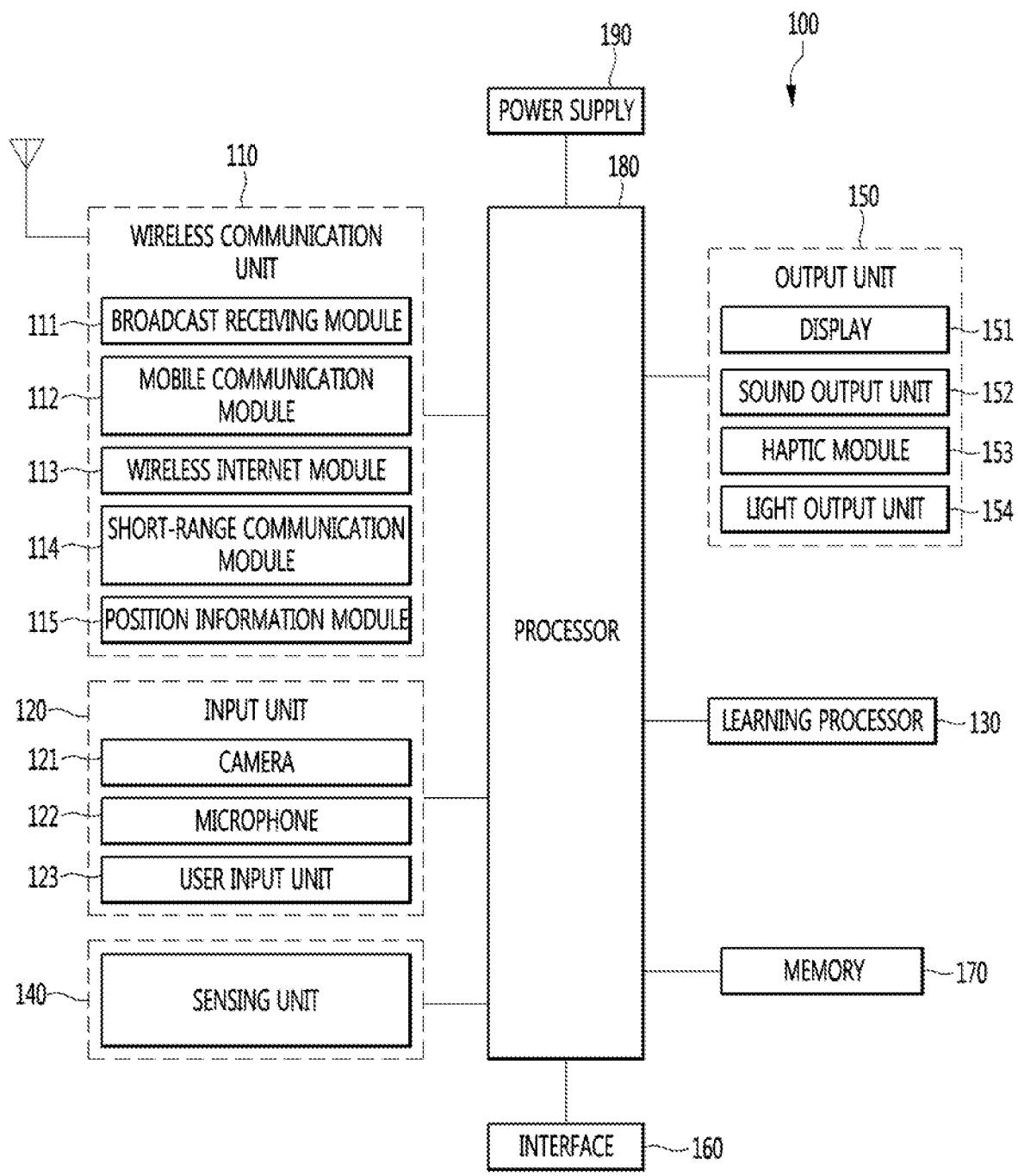
FIG. 1 is a block diagram illustrating a terminal according to the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" or "unit" may be used to refer to elements or components. Use of such a suffix herein is merely intended to facilitate description of the specification, and the suffix itself is not intended to have any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

While ordinal numbers including 'first', 'second', etc. may be used to describe various components, they are not intended to limit the components. These expressions may be used to distinguish one component from another component When it is said that a component is 'coupled with/to' or 'connected to' another component, it should be understood that the one component is connected to the other component directly or through any other component in between. On the other hand, when it is said that a component is 'directly connected to' or 'directly coupled to' another component, it should be understood that there is no other component between the components.

The terminal described in this specification may include cellular phones, smart phones, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

However, the artificial intelligence device 100 described in this specification is applicable to stationary terminals such as smart TVs, desktop computers or digital signages.

In addition, the terminal 100 according to the embodiment of the present invention is applicable to stationary or mobile robots.

In addition, the terminal 100 according to the embodiment of the present invention may perform the function of a speech agent. The speech agent may be a program for recognizing the speech of a user and audibly outputting a response suitable to the recognized speech of the user.

The terminal 100 may include a wireless communication unit 110, an input unit 120, a learning processor 130, a sensing unit 140, an output unit 150, an interface 160, a memory 170, a processor 180 and a power supply 190.

The wireless communication unit 110 may include at least one of a broadcast reception module 111, a mobile communication module 112, a wireless Internet module 113, a short-range communication module 114 and a location information module 115.

The broadcast reception module 111 receives broadcast signals and/or broadcast associated information from an external broadcast management server through a broadcast channel.

The mobile communication module 112 may transmit and/or receive wireless signals to and from at least one of a base station, an external terminal, a server, and the like over a mobile communication network established according to technical standards or communication methods for mobile communication (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless Internet module 113 is configured to facilitate wireless Internet access. This module may be installed inside or outside the terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

The short-range communication module 114 is configured to facilitate short-range communication and to support short-range communication using at least one of Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The location information module 115 is generally configured to acquire the position (or the current position) of the mobile terminal. Representative examples thereof include a Global Position System (GPS) module or a Wi-Fi module. As one example, when the terminal uses a GPS module, the position of the mobile terminal may be acquired using a signal sent from a GPS satellite.

The input unit 120 may include a camera 121 for receiving a video signal, a microphone 122 for receiving an audio signal, and a user input unit 123 for receiving information from a user.

Voice data or image data collected by the input unit 120 may be analyzed and processed as a control command of the user.

The input unit 120 may receive video information (or signal), audio information (or signal), data or user input information. For reception of video information, the terminal 100 may include one or a plurality of cameras 121.

The camera 121 may process image frames of still images or moving images obtained by image sensors in a video call more or an image capture mode. The processed image frames can be displayed on the display 151 or stored in memory 170.

The microphone 122 processes an external acoustic signal into electrical audio data. The processed audio data may be variously used according to function (application program) executed in the terminal 100. Meanwhile, the microphone 122 may include various noise removal algorithms to remove noise generated in the process of receiving the external acoustic signal.

The user input unit 123 receives information from a user. When information is received through the user input unit 123, The processor 180 may control operation of the terminal 100 in correspondence with the input information.

The user input unit 123 may include one or more of a mechanical input element (for example, a mechanical key, a button located on a front and/or rear surface or a side surface of the terminal 100, a dome switch, a jog wheel, a jog switch, and the like) or a touch input element. As one example, the touch input element may be a virtual key, a soft key or a visual key, which is displayed on a touchscreen through software processing, or a touch key located at a location other than the touchscreen.

The learning processor 130 may be configured to receive, classify, store and output information to be used for data mining, data analysis, intelligent decision, mechanical learning algorithms and techniques.

The learning processor 130 may include one or more memory units configured to store data received, detected, sensed, generated or output in a predetermined manner or another manner by the terminal or received, detected, sensed, generated or output in a predetermined manner or another manner by another component, device, terminal or device for communicating with the terminal.

The learning processor 130 may include a memory integrated with or implemented in the terminal. In some embodiment, the learning processor 130 may be implemented using the memory 170.

Selectively or additionally, the learning processor 130 may be implemented using a memory related to the terminal, such as an external memory directly coupled to the terminal or a memory maintained in a server communicating with the terminal.

In another embodiment, the learning processor 130 may be implemented using a memory maintained in a cloud computing environment or another remote memory accessible by the terminal through the same communication scheme as a network.

The learning processor 130 may be configured to store data in one or more databases in order to identify, index, categorize, manipulate, store, retrieve and output data to be used for supervised or unsupervised learning, data mining, predictive analysis or other machines.

Information stored in the learning processor 130 may be used by one or more other controllers of the terminal or the processor 180 using any one of different types of data analysis algorithms and machine learning algorithms.

Examples of such algorithms include k-nearest neighbor systems, fuzzy logic (e.g., possibility theory), neural networks, Boltzmann machines, vector quantization, pulse neural networks, support vector machines, maximum margin classifiers, hill climbing, inductive logic system Bayesian networks, Petri Nets (e.g., finite state machines, Mealy machines or Moore finite state machines), classifier trees (e.g., perceptron trees, support vector trees, Marcov trees, decision tree forests, random forests), betting models and systems, artificial fusion, sensor fusion, image fusion, reinforcement learning, augmented reality, pattern recognition, and automated planning.

The processor 180 may make a decision using data analysis and machine learning algorithms and determine or predict at least one executable operation of the terminal based on the generated information. To this end, the processor 180 may request, retrieve, receive or use the data of the processor 130 and control the terminal to execute preferable operation or predicted operation of at least one executable operation.

The processor 180 may perform various functions for implementing intelligent emulation (that is, a knowledge based system, an inference system and a knowledge acquisition system). This is applicable to various types of systems (e.g., a fussy logic system) including an adaptive system, a machine learning system, an artificial neural system, etc.

The processor 180 may include a sub module for enabling operation involving speech and natural language speech processing, such as an I/O processing module, an environmental condition module, speech-to-text (STT) processing module, a natural language processing module, a workflow processing module and a service processing module.

Each of such sub modules may have an access to one or more systems or data and models at the terminal or a subset or superset thereof. In addition, each of the sub modules may provide various functions including vocabulary index, user data, a workflow model, a service model and an automatic speech recognition (ASR) system.

In another embodiment, the other aspects of the processor 180 or the terminal may be implemented through the above-described sub modules, systems or data and models.

In some embodiments, based on the data of the learning processor 130, the processor 180 may be configured to detect and sense requirements based on the context condition or user's intention expressed in user input or natural language input.

The processor 180 may actively derive and acquire information necessary to fully determine the requirements based on the context condition or user's intention. For example, the processor 180 may actively derive information necessary to determine the requirements, by analyzing historical data including historical input and output, pattern matching, unambiguous words, and input intention, etc.

The processor 180 may determine a task flow for executing a function for responding to the requirements based on the context condition or the user's intention.

The processor 180 may be configured to collect, sense, extract, detect and/or receive signals or data used for data analysis and machine learning operations through one or more sensing components at the terminal, in order to collect information for processing and storage from the learning processor 130.

Information collection may include sensing information through a sensor, extracting information stored in the memory 170, or receiving information from another terminal, an entity or an external storage device through a communication unit.

The processor 180 may collect and store usage history information from the terminal.

The processor 180 may determine the best match for executing a specific function using the stored usage history information and predictive modeling.

The processor 180 may receive or sense surrounding environment information or other information through the sensing unit 140.

The processor 180 may receive broadcast signals and/or broadcast related information, wireless signals or wireless data through the wireless communication unit 110.

The processor 180 may receive image information (or signals corresponding thereto), audio signal (or signals corresponding thereto), data or user input information from the input unit 120.

The processor 180 may collect information in real time, process or classify the information (e.g., a knowledge graph, a command policy, a personalization database, a dialog engine, etc.), and store the processed information in the memory 170 or the learning processor 130.

When the operation of the terminal is determined based on data analysis and machine learning algorithms and techniques, the processor 180 may control the components of the terminal in order to execute the determined operation. The processor 180 may control the terminal according to a control command and perform the determined operation.

When the specific operation is performed, the processor 180 may analyze historical information indicating execution of the specific operation through data analysis and machine learning algorithms and techniques and update previously learned information based on the analyzed information.

Accordingly, the processor 180 may improve accuracy of future performance of data analysis and machine learning algorithms and techniques based on the updated information, along with the learning processor 130.

The sensing unit 140 may include one or more sensors configured to sense internal information of the mobile terminal, the surrounding environment of the mobile terminal, user information, and the like.

For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121), a microphone 122, a battery gauge, an environment sensor (for example, a barometer, a hygrometer, a thermometer, a radiation detection sensor, a thermal sensor, and a gas sensor), and a chemical sensor (for example, an electronic nose, a health care sensor, a biometric sensor, and the like). The mobile terminal disclosed in this specification may be configured to combine and utilize information obtained from at least two sensors of such sensors.

The output unit 150 is typically configured to output various types of information, such as audio, video, tactile output, and the like. The output unit 150 may include a display 151, an audio output module 152, a haptic module 153, and a light output unit 154.

The display 151 is generally configured to display (output) information processed in the terminal 100. For example, the display 151 may display execution screen information of an application program executed by the terminal 100 or user interface (UI) and graphical user interface (GUI) information according to the executed screen information.

The display 151 may have an inter-layered structure or an integrated structure with a touch sensor in order to realize a touchscreen. The touchscreen may provide an output interface between the terminal 100 and a user, as well as function as the user input unit 123 which provides an input interface between the terminal 100 and the user.

The audio output module 152 is generally configured to output audio data received from the wireless communication unit 110 or stored in the memory 170 in a call signal reception mode, a call mode, a record mode, a speech recognition mode, a broadcast reception mode, and the like.

The audio output module 152 may also include a receiver, a speaker, a buzzer, or the like.

A haptic module 153 can be configured to generate various tactile effects that a user feels. A typical example of a tactile effect generated by the haptic module 153 is vibration.

A light output unit 154 may output a signal for indicating event generation using light of a light source of the terminal 100. Examples of events generated in the terminal 100 may include message reception, call signal reception, a missed call, an alarm, a schedule notice, email reception, information reception through an application, and the like.

The interface 160 serves as an interface with external devices to be connected with the terminal 100. The interface 160 may include wired or wireless headset ports, external power supply ports, wired or wireless data ports, memory card ports, ports for connecting a device having an identification module, audio input/output (I/O) ports, video I/O ports, earphone ports, or the like. The terminal 100 may perform appropriate control related to the connected external device in correspondence with connection of the external device to the interface 160.

The identification module may be a chip that stores a variety of information for granting use authority of the terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface 160.

The memory 170 stores data supporting various functions of the terminal 100.

The memory 170 may store a plurality of application programs or applications executed in the terminal 100, data and commands for operation of the terminal 100, and data for operation of the learning processor 130 (e.g., at least one piece of algorithm information for machine learning).

The processor 180 generally controls overall operation of the terminal 100, in addition to operation related to the application program. The processor 180 may process signals, data, information, etc. input or output through the above-described components or execute the application program stored in the memory 170, thereby processing or providing appropriate information or functions to the user.

In addition, the processor 180 may control at least some of the components described with reference to FIG. 1 in order to execute the application program stored in the memory 170. Further, the processor 180 may operate a combination of at least two of the components included in the terminal 100, in order to execute the application program.

The power supply 190 receives external power or internal power and supplies the appropriate power required to operate respective components included in the terminal 100, under control of the controller 180. The power supply 190 may include a battery, and the battery may be a built-in or rechargeable battery.

Meanwhile, as described above, the processor 180 controls operation related to the application program and overall operation of the terminal 100. For example, the processor 180 may execute or release a lock function for limiting input of a control command of the user to applications when the state of the mobile terminal satisfies a set condition.

Figure 2:
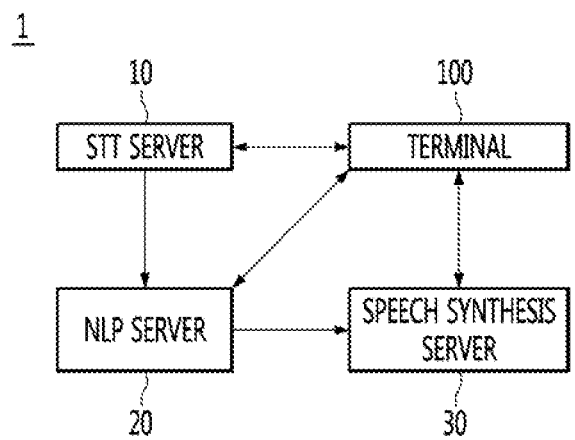
FIG. 2 is a diagram illustrating a speech system according to an embodiment of the present invention.

FIG. 2 is a diagram illustrating a speech system according to an embodiment of the present invention.

Referring to FIG. 2, the speech system 1 includes an terminal 100, a speech-to-text (STT) server 10, a natural language processing (NLP) server 20 and a speech synthesis server 30.

The terminal 100 may transmit speech data to the STT server 10.

The STT server 10 may convert the speech data received from the terminal 100 into text data.

The STT server 10 may increase accuracy of speech-text conversion using a language model.

The language model may mean a model capable of calculating a probability of a sentence or a probability of outputting a next word is output when previous words are given.

For example, the language model may include probabilistic language models such as a unigram model, a bigram model, an N-gram model, etc.

The unigram model refers to a model that assumes that use of all words is completely independent of each other and calculates the probability of a word string by a product of the probabilities of words.

The bigram model refers to a model that assumes that use of words depends on only one previous word.

The N-gram model refers to a model that assumes that use of words depends on (n−1) previous words.

That is, the STT server 10 may determine when the speech data is appropriately converted into the text data using the language model, thereby increasing accuracy of conversion into the text data.

The NLP server 20 may receive the text data from the STT server 10. The NLP server 20 may analyze the intention of the text data based on the received text data.

The NLP server 20 may transmit intention analysis information indicating the result of performing intention analysis to the terminal 100.

The NLP server 20 may sequentially perform a morpheme analysis step, a syntax analysis step, a speech-act analysis step, a dialog processing step with respect to text data, thereby generating intention analysis information.

The morpheme analysis step refers to a step of classifying the text data corresponding to the speech uttered by the user into morphemes as a smallest unit having a meaning and determining the part of speech of each of the classified morphemes.

The syntax analysis step refers to a step of classifying the text data into a noun phrase, a verb phrase, an adjective phrase, etc. using the result of the morpheme analysis step and determines a relation between the classified phrases.

Through the syntax analysis step, the subject, object and modifier of the speech uttered by the user may be determined.

The speech-act analysis step refers to a step of analyzing the intention of the speech uttered by the user using the result of the syntax analysis step. Specifically, the speech-act step refers to a step of determining the intention of a sentence such as whether the user asks a question, makes a request, or expresses simple emotion.

The dialog processing step refers to a step of determining whether to answer the user's utterance, respond to the user's utterance or question about more information.

The NLP server 20 may generate intention analysis information including at least one of the answer to, a response to, or a question about more information on the intention of the user's utterance, after the dialog processing step.

Meanwhile, the NLP server 20 may receive the text data from the terminal 100. For example, when the terminal 100 supports the speech-to-text conversion function, the terminal 100 may convert the speech data into the text data and transmit the converted text data to the NLP server 20.

The speech synthesis server 30 may synthesize prestored speech data to generate a synthesized speech.

The speech synthesis server 30 may record the speech of the user selected as a model and divide the recorded speech into syllables or words. The speech synthesis server 30 may store the divided speech in an internal or external database in syllable or word units.

The speech synthesis server 30 may retrieve syllables or words corresponding to the given text data from the database and synthesize the retrieved syllables or words, thereby generating the synthesized speech.

The speech synthesis server 30 may store a plurality of speech language groups respectively corresponding to a plurality of languages.

For example, the speech synthesis server 30 may include a first speech language group recorded in Korean and a second speech language group recorded in English.

The speech synthesis server 30 may translate text data of a first language into text of a second language and generate a synthesized speech corresponding to the translated text of the second language using the second speech language group.

The speech synthesis server 30 may transmit the synthesized speech to the terminal 100.

The speech synthesis server 30 may receive the intention analysis information from the NLP server 20.

The speech synthesis server 30 may generate the synthesized speech including the intention of the user based on the intention analysis information.

In one embodiment, the STT server 10, the NLP server 20 and the speech synthesis server 30 may be implemented as one server.

The respective functions of the STT server 10, the NLP server 20 and the speech synthesis server 30 may also be performed in the terminal 100. To this end, the terminal 100 may include a plurality of processors.

Figure 3:
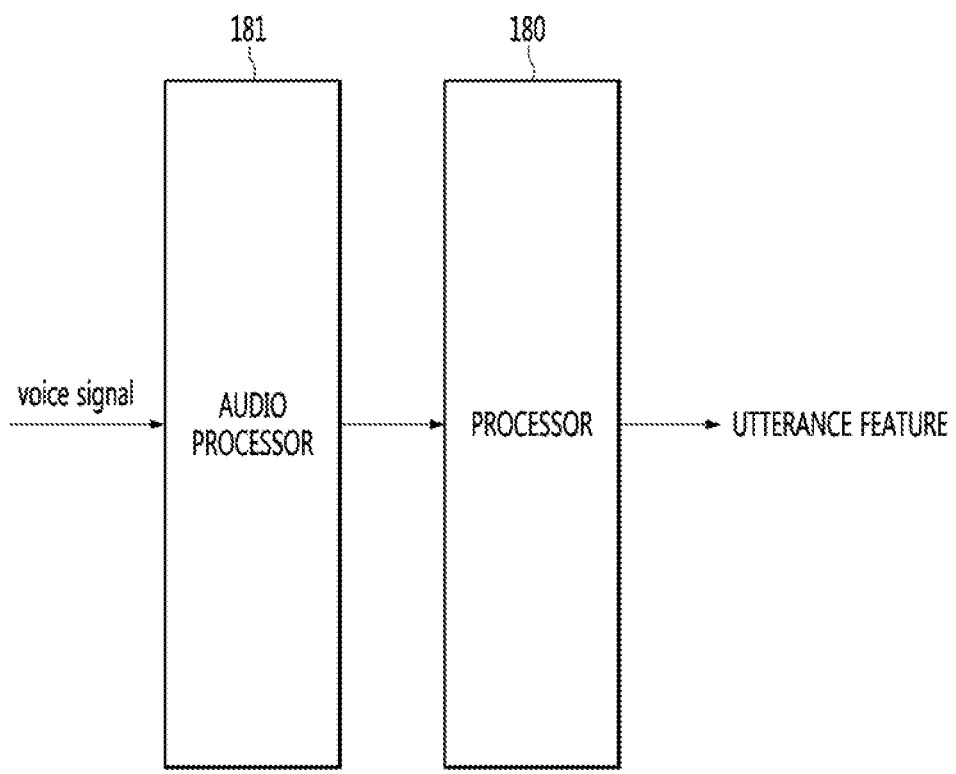
FIG. 3 is a diagram illustrating a process of extracting utterance features of a user from a speech signal according to an embodiment of the present invention.

FIG. 3 is a diagram illustrating a process of extracting utterance features of a user from a speech signal according to an embodiment of the present invention.

The terminal 100 shown in FIG. 1 may further include an audio processor 181.

The audio processor 181 may be implemented as a chip separated from the processor 180 or a chip included in the processor 180.

The audio processor 181 may remove noise from the speech signal.

The audio processor 181 may convert the speech signal into text data. To this end, the audio processor 181 may include an STT engine.

The audio processor 181 may recognize a wake-up word for activating speech recognition of the terminal 100. The audio processor 181 may convert the wake-up word received through the microphone 121 into text data and determine that the wake-up word is recognized when the converted text data corresponds to the prestored wake-up word.

The audio processor 181 may convert the speech signal, from which noise is removed, into a power spectrum.

The power spectrum may be a parameter indicating a frequency component included in the waveform of the speech signal varying with time, and a magnitude thereof.

The power spectrum shows a distribution of an amplitude squared value according to the frequency of the waveform of the speech signal.

This will be described with reference to FIG. 4.

Figure 4:
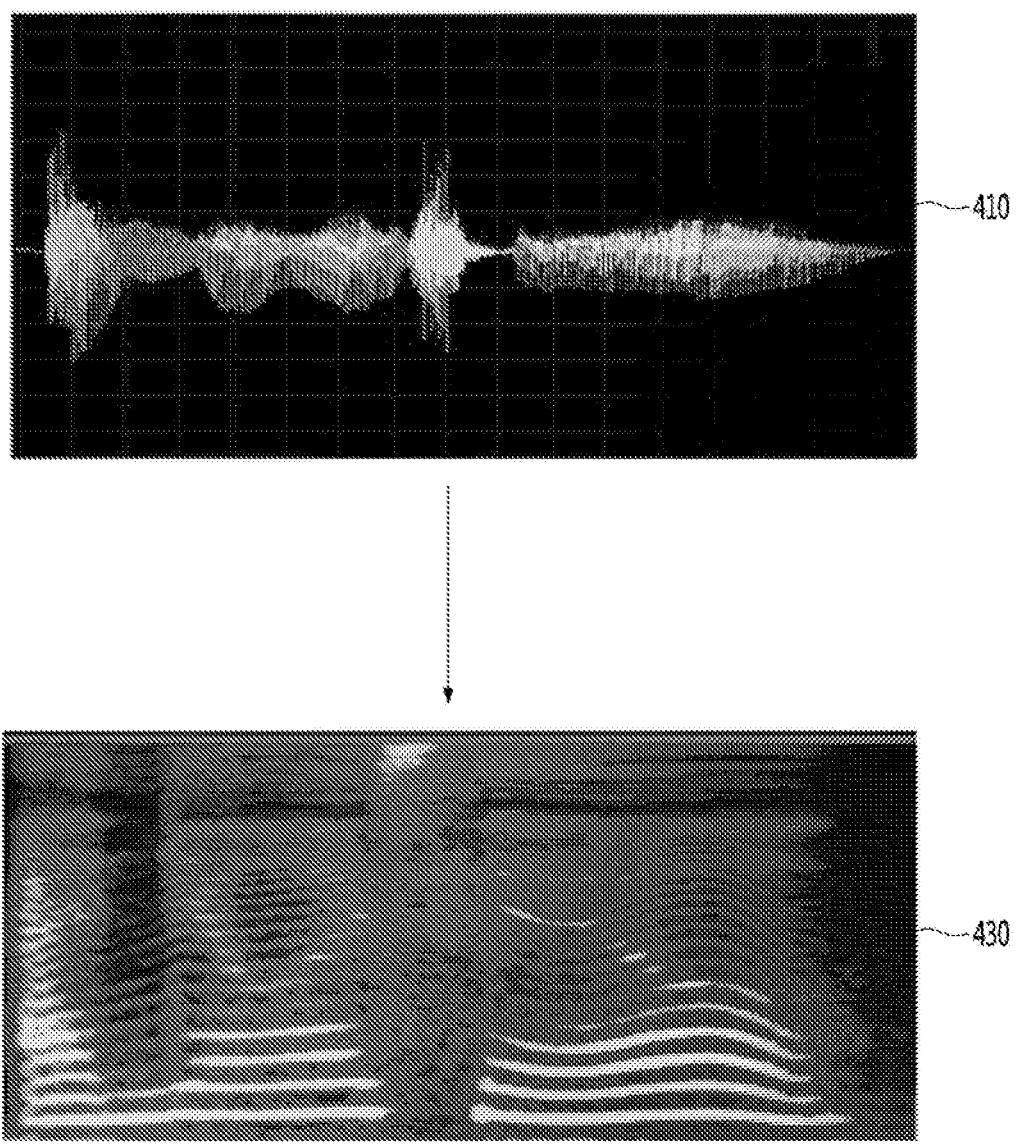
FIG. 4 is a diagram illustrating an example of converting a speech signal into a power spectrum according to an embodiment of the present invention.

FIG. 4 is a diagram illustrating an example of converting a speech signal into a power spectrum according to an embodiment of the present invention.

Referring to FIG. 4, the speech signal 410 is shown. The speech signal 410 may be received through the microphone 121 or prestored in the memory 170.

The x-axis of the speech signal 410 denotes a time and the y-axis denotes an amplitude.

The audio processor 181 may convert the speech signal 410, the x-axis of which is a time axis, into a power spectrum 430, the x-axis of which is a frequency axis.

The audio processor 181 may convert the speech signal 410 into the power spectrum 430 using Fast Fourier transform (FFT).

The x-axis of the power spectrum 430 denotes a frequency and the y-axis of the power spectrum 430 denotes a squared value of an amplitude.

FIG. 3 will be described again.

The processor 180 may determine utterance features of a user using at least one of the power spectrum 430 or the text data received from the audio processor 181.

The utterance features of the user may include the gender of the user, the pitch of the user, the tone of the user, the topic uttered by the user, the utterance speed of the user, the volume of the user's voice, etc.

The processor 180 may acquire the frequency of the speech signal 410 and the amplitude corresponding to the frequency using the power spectrum 430.

The processor 180 may determine the gender of the user who utters a speech, using the frequency band of the power spectrum 430.

For example, the processor 180 may determine the gender of the user as a male when the frequency band of the power spectrum 430 is within a predetermined first frequency band range.

The processor 180 may determine the gender of the user as a female when the frequency band of the power spectrum 430 is within a predetermined second frequency band range. Here, the second frequency band range may be larger than the first frequency band range.

The processor 180 may determine the pitch of the speech using the frequency band of the power spectrum 430.

For example, the processor 180 may determine the pitch of the speech according to the amplitude within a specific frequency band range.

The processor 180 may determine the tone of the user using the frequency band of the power spectrum 430. For example, the processor 180 may determine a frequency band having a certain amplitude or more among the frequency bands of the power spectrum 430 as a main register of the user and determines the determined main register as the tone of the user.

The processor 180 may determine the utterance speed of the user through the number of syllables uttered per unit time from the converted text data.

The processor 180 may determine the topic uttered by the user using a Bag-Of-Word Model scheme with respect to the converted text data.

The Bag-Of-Word Model scheme refers to a scheme for extracting mainly used words based on the frequency of words in a sentence. Specifically, the Bag-Of-Word Model scheme refers to a scheme for extracting unique words from a sentence, expressing the frequency of the extracted words by a vector and determining the uttered topic as a feature.

For example, when words <running>, <physical strength>, etc. frequently appears in the text data, the processor 180 may classify the topic uttered by the user into an exercise.

The processor 180 may determine the topic uttered by the user from the text data using a known text categorization scheme. The processor 180 may extract keywords from the text data and determine the topic uttered by the user.

The processor 180 may determine the volume of user's voice in consideration of the amplitude information in an entire frequency band.

For example, the processor 180 may determine the volume of user's voice based on an average or weighted average of amplitudes in each frequency band of the power spectrum.

The functions of the audio processor 181 and the processor 180 described with reference to FIGS. 3 and 4 may be performed in any one of the NLP server 20 or the speech synthesis server 30.

For example, the NLP server 20 may extract the power spectrum using the speech signal and determine the utterance features of the user using the extracted power spectrum.

FIG. 5 is a block diagram illustrating the configuration of a speech synthesis server according to an embodiment of the present invention.

The speech synthesis server 30 is a device or server disposed outside the terminal 100 and may perform the same function as the learning processor 130 of the terminal 100.

That is, the speech synthesis server 30 may be configured to receive, classify, store and output information to be used for data mining, data analysis, intelligent decision, mechanical learning algorithms. Here, the machine learning algorithms may include a deep learning algorithm.

The speech synthesis server 30 may communicate with at least one terminal 100 and derive a result by analyzing or learning data instead of or in aid of the terminal 100. Aiding another device may mean distribution of computing power through distribution processing.

The speech synthesis server 30 is a variety of devices for learning an artificial neural network, may generally mean a server, and may be referred to as a learning device or a learning server.

In particular, the speech synthesis server 30 may be implemented not only as a single server but also as a plurality of server sets, a cloud server or a combination thereof.

That is, a plurality of speech synthesis servers 30 may configure a learning device set (or a cloud server) and at least one speech synthesis server 30 included in the learning device set may derive a result by analyzing or learning data through distribution processing.

The speech synthesis server 30 may transmit a model learned by machine learning or deep learning to the terminal 100 periodically or according to a request.

Referring to FIG. 5, the speech synthesis server 30 may include a communication unit 210, an input unit 220, a memory 230, a learning processor 240, a power supply 250 and a processor 260.

The communication unit 210 may correspond to a component including the wireless communication unit 110 and the interface 160 of FIG. 1. That is, data may be transmitted to and received from another device through wired/wireless communication or an interface.

The input unit 220 may correspond to the input unit 120 of FIG. 1 and acquire data by receiving data through the communication unit 210.

The input unit 220 may acquire input data for acquiring output using training data for model learning or a trained model.

The input unit 220 may acquire raw input data. In this case, the processor 260 may preprocess the acquired data to generate training data or preprocessed input data capable of being input to model learning.

At this time, preprocessing of the input data performed by the input unit 220 may mean extraction of input features from the input data.

The memory 230 may correspond to the memory 170 of FIG. 1.

The memory 230 may include a model storage unit 231 and a database 232.

The model storage unit 231 stores a model (or an artificial neural network 231a) which is learned or being learned through the learning processor 240 and stores an updated model when the model is updated through learning.

At this time, the model storage unit 231 may classify and store the trained model into a plurality of versions according to a learning time point or learning progress, as necessary.

The artificial neural network 231a shown in FIG. 2 is merely an example of the artificial neural network including a plurality of hidden layers and the artificial neural network of the present invention is not limited thereto.

The artificial neural network 231a may be implemented in hardware, software or a combination of hardware and software. When some or the whole of the artificial neural network 231a is implemented in software, one or more commands configuring the artificial neural network 231a may be stored in the memory 230.

The database 232 stores the input data acquired by the input unit 220, learning data (or training data) used for model learning, or a learning history of a model.

The input data stored in the database 232 may be not only data processed to suit model learning but also raw input data.

The learning processor 240 corresponds to the learning processor 130 of FIG. 1.

The learning processor 240 may train or learn the artificial neural network 231a using training data or a training set.

The learning processor 240 may immediately acquire data obtained by preprocessing the input data acquired by the processor 260 through the input unit 220 to learn the artificial neural network 231a or acquire the preprocessed input data stored in the database 232 to learn the artificial neural network 231a.

Specifically, the learning processor 240 may determine the optimized model parameters of the artificial neural network 231a, by repeatedly learning the artificial neural network 231a using the above-described various learning schemes.

In this specification, the artificial neural network having parameters determined through learning using training data may be referred to as a training model or a trained model.

At this time, the training model may infer a result value in a state of being installed in the speech synthesis server 30 of the artificial neural network and may be transmitted to and installed in another device such as the terminal 100 through the communication unit 210.

In addition, when the training model is updated, the updated training model may be transmitted to and installed in another device such as the terminal 100 through the communication unit 210.

The power supply 250 corresponds to the power supply 190 of FIG. 1.

A repeated description of components corresponding to each other will be omitted.

FIGS. 6 and 7 are views illustrating a class imbalance problem when a reading break is predicted through a conventional synthesized speech.

FIG. 6 is a view showing a result of performing reading with break through a synthesized speech at a synthesized speech engine with respect to one sentence 600.

The synthesized speech engine may convert text into speech and output the speech.

The synthesized speech engine may be provided in the terminal 100 or the speech synthesis server 30.

A space bar 601 indicates that reading break is 1, </> 603 indicates that the reading break is 2 and <//> 605 indicates that the reading break is 3.

The reading break may indicate a time interval when text is read. That is, as the reading break increases, the time interval when text is read may increase. In contrast, as the reading break decreases, the time interval when text is read may decrease.

FIG. 7 shows a class table 700 indicating a result of analyzing the reading break with respect to the sentence 600 of FIG. 6.

The class table 700 may include a word phrase (WP) class, an accentual phrase (AP) class and an intonation phrase (IP) class.

The word phrase class indicates that reading break is 1 and may indicate a class that words are read without break.

The accentual phrase class indicates that reading break is 2 and may indicate that break between words is small.

The intonation phrase class indicates that reading break is 3 and may indicate that break between words is large.

In the sentence 600 of FIG. 6, the count of word phrase classes is 7, the count of accentual phrase classes is 19 and the count of intonation phase classes is 4.

A class with a smallest count is called a minor class and a class with a largest count is called a major class.

In FIG. 7, the intonation phrase class may be the minor class and the accentual phrase class may be the major class.

When class imbalance in which the count of intonation phrase classes is less than the count of the other classes occurs, in a machine learning process of reading with break through a synthesized speech, the intonation phrase class may be determined as being less important and reading break performance of the synthesized speech model may deteriorate.

Specifically, for reading break learning of the synthesized speech model, a training set including one sentence (training data) and labeling data for labeling words configuring the sentence with reading breaks is required.

When data with class imbalance is used as labeling data, performance of the synthesized speech model may deteriorate.

When performance of the synthesized speech model deteriorates, reading with break may become unnatural when the synthesized speech is output and thus users may feel uncomfortable when listening to the synthesized speech.

In order to solve such a problem, in the present invention, the counts of classes are adjusted in a balanced way, thereby improving reading break prediction performance.

Figure 8:
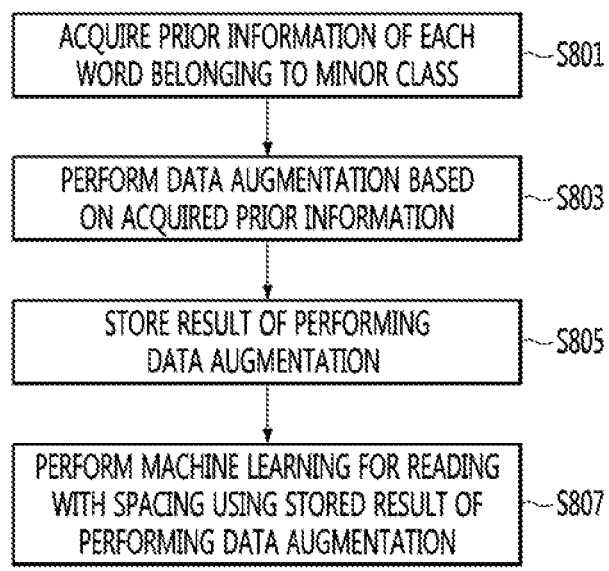
FIG. 8 is a flowchart illustrating a method of operating a speech synthesis server according to an embodiment of the present invention.

FIG. 8 is a flowchart illustrating a method of operating a speech synthesis server according to an embodiment of the present invention.

The processor 260 of the speech synthesis server 30 acquires prior information of each of a plurality of words corresponding to the minor class (S801).

Hereinafter, assume that the minor class is the intonation phrase class of FIG. 7.

A word belonging to (or being classified into) the intonation phrase class means that a word located before </> indicating reading break of 3, such as <government's> shown in FIG. 6, belongs to the intonation phrase class.

In one embodiment, the prior information may include one or more of an intonation phrase (hereinafter referred to as IP) ratio of a word, an IP frequency number, a non-IP ratio, a non-IP frequency number, or a ratio of the non-IP frequency number to the IP frequency number.

The IP ratio may indicate a ratio in which a word is classified into the IP class, in the database 232. Specifically, in 10000 sentences in the database 232, when the number of times of classifying a first word into an IP class is 100, the IP ratio of the first word may be 1% (100/10000×100).

In the 10000 sentences, when the number of times of classifying a second word into the IP class is 200, the IP ratio of the second word may be 2%.

Of course, only some of the 10000 sentences may include the first word or the second word.

The IP frequency number may indicate the number of times of classifying a word into the IP class in the database 232. In the above example, the IP frequency number of the first word may be 100 and the IP frequency number of the second word may be 200.

The non-IP ratio may indicate a ratio of a word classified into a class other than the IP class in the database 232.

For example, in 10000 sentences of the database 232, when the number of times of classifying the first word into a class other than the IP class is 500, the non-IP ratio of the first word may be 5% (500/10000×100).

The non-IP frequency number may indicate the number of times in which the word is not classified into the IP class in the database 232.

For example, in 10000 sentences of the database, when the number of times in which the first word is not classified into the IP class is 300, the non-IP ratio of the first word may be 3% (300/10000×100).

The processor 260 of the speech synthesis server 30 performs data augmentation with respect to each data based on the acquired prior information (S803).

In one embodiment, data augmentation may be a process of increasing a frequency number in which a word belongs to a specific class in order to increase a probability that the word belongs to the specific class.

Increasing the frequency number in which the word belongs to the specific class may indicate that the number of sentences including the word belonging to the specific class increases.

This may be interpreted as increasing a training set for learning of the synthesized speech model.

This will be described in detail below.

The processor 260 of the speech synthesis server 30 stores a result of performing data augmentation in the database 232 (S805).

The processor 260 of the speech synthesis server 30 or the learning processor 240 performs machine learning for reading with break using the stored result of performing data augmentation (S807).

Machine learning for reading with break may be a process of determining with which break the words configuring a sentence is read when the sentence is input.

That is, machine learning for reading with break may be learning for classifying one sentence into a word phrase class, an accentual phrase class and an intonation phrase class.

A synthesized speech model may be generated according to machine learning for reading with break.

The synthesized speech model may refer to a model for receiving one sentence as input data and outputting synthesized speech data in which words configuring one sentence are classified into three optimized reading break classes.

The processor 260 of the speech synthesis server 30 may transmit the generated synthesized speech model to the terminal 100 through the communication unit 210.

Figure 9:
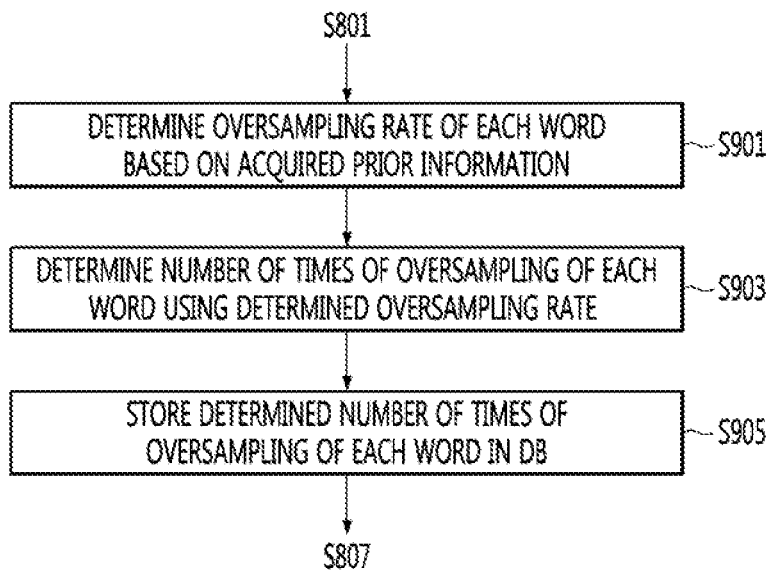
FIG. 9 is a flowchart illustrating a process of performing data augmentation of a word based on prior information according to an embodiment of the present invention.

FIG. 9 is a flowchart illustrating a process of performing data augmentation of a word based on prior information according to an embodiment of the present invention.

In particular, FIG. 9 is a view illustrating steps S803 and S805 shown in FIG. 8 in detail.

The processor 260 of the speech synthesis server 30 determines the oversampling rate of each word based on the prior information of the word (S901)

In one embodiment, the processor 260 may determine the oversampling rate of the word based on the ratio of the non-IP frequency number to the IP frequency number of the word classified into the minor class.

The oversampling rate may indicate a rate at which the word belongs to the IP class in the database 232.

The processor 260 may increase the oversampling rate as the ratio of the non-IP frequency number to the IP frequency number of the word increases.

The processor 260 may decrease the oversampling rate as the ratio of the non-IP frequency number to the IP frequency number of the word increases.

This will be described with reference to FIG. 10.

Figures 10, 11:
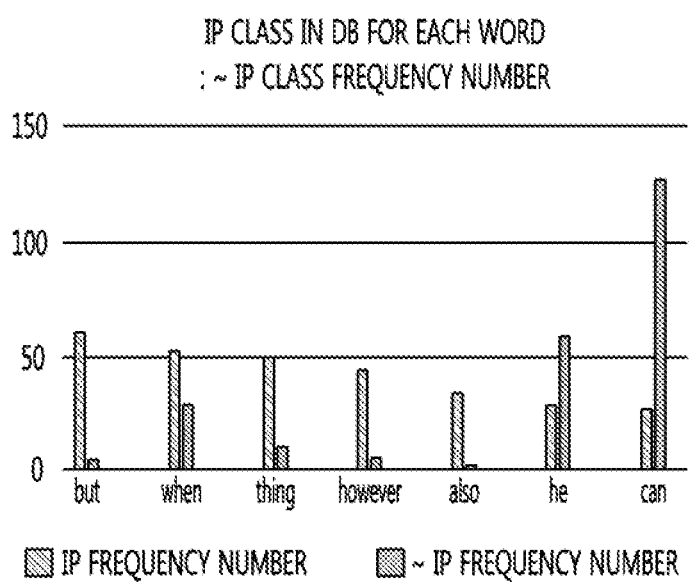
FIG. 10 is a view showing an IP frequency number and a non-IP frequency number of each word stored in a database according to an embodiment of the present invention.
FIG. 11 is a view illustrating an oversampling rate determined according to a ratio of a non-IP frequency number to an IP frequency number.

FIG. 10 is a view showing an IP frequency number and a non-IP frequency number of each word stored in a database according to an embodiment of the present invention.

FIG. 10 shows a result obtained by measuring reading break after uttering a specific word when a voice actor utters a large number of sentences, in order to generate a synthesized speech.

For example, assume that the frequency number in which a word <but> is classified into the IP class in the database 232 is 60 and the frequency number in which the word <but> is classified into the non-IP class instead of the IP class is 10.

Since the ratio of the non-IP frequency number to the IP frequency number is 1:6, the processor 260 may determine that the oversampling rate of the word <but> is 60% (6/1×0.1).

For example, the processor 260 may increase the existing frequency number, in which the word <but> is classified into the IP class, to 96 which is greater than 60 by 60%.

In another example, assume that the frequency number in which a word <can> is classified into the IP class in the database 232 is 30 and the frequency number in which the word <can> is classified into the non-IP class instead of the IP class is 120.

Since the ratio of the non-IP frequency number to the IP frequency number is 4:1, the processor 260 may determine that the oversampling rate of the word <can> is 2.5% (¼×0.1).

For example, the processor 260 may increase the existing frequency number, in which the word <can> is classified into the IP class, to 3.075 which is greater than 30 by 2.5%.

In another example, the processor 260 may increase the oversampling rate only when the IP frequency number of the word is greater than the non-IP frequency number of the word.

In contrast, the processor 260 may not perform oversampling of the word when the IP frequency number of the word is less than the non-IP frequency number of the word. That is, the processor 260 may fix the oversampling rate when the IP frequency number of the word is less than the non-IP frequency number of the word.

FIG. 11 is a view illustrating an oversampling rate determined according to a ratio of a non-IP frequency number to an IP frequency number.

FIG. 11 shows the oversampling rate determined according to the ratio of the non-IP frequency number to the IP frequency number of the word of FIG. 10 in the 10000 sentences stored in the database 232.

That is, FIG. 11 shows the non-IP frequency number in which each word is not classified into the IP class, the IP frequency number in which each word is classified into the IP class, the relative ratio of non-IP frequency number to the IP frequency number, and the oversampling rate determined according to the relative ratio.

As can be seen from FIG. 11, as the relative ratio increases, the oversampling rate increases. As the relative ratio decreases, the oversampling rate decreases.

When the oversampling rate increases, a probability that the word is classified into the IP class may increase.

When the probability that the word is classified into the IP class increases, the class imbalance can be solved and the reading break performance of the synthesized speech model may increase.

FIG. 9 will be described again.

The processor 260 of the speech synthesis server 30 determines the number of times of oversampling of the word using the determined oversampling rate (S903).

In one embodiment, the number of times of oversampling of the word may indicate the IP frequency number to be increased based on the determined oversampling rate of the word.

The IP frequency number to be increased may indicate the number of sentences including the word classified into the IP class.

That is, increasing the number of times of oversampling of the word may indicate that the number of sentences including the word classified into the IP class increases.

In one embodiment, the processor 260 may determine the number of times of oversampling of the word based on the oversampling rate determined in step S901.

In another embodiment, the processor 260 may determine the number of times of oversampling the word, based on the oversampling rate, the number of words classified into the major class in the database 232, the number of words classified into the minor class, the number of times of labeling the word with the minor class, a probability that the word belongs to the minor class, and the number of times in which the word appears in the database 232.

Specifically, the processor 260 may determine the number of times of oversampling as shown in Equation 1 below.

where, $word_i$ may indicate a specific word present in the database 232, [Equation 1]

$$word_{i:over} = SamplingRate + \frac{|Class_{Major}|}{|Class_{minor}|} * |word_i = \text{minor}| * P(word_{i=minor})$$

$word_{i:over}$ may indicate the number of times of oversampling of $word_i$,

Sampling Rate may be a constant determined in step S901 and may have a value of 10% to 100%, but this is merely an example, $|Class_{Major}|$ may indicate the number of words in the major class, $|Class_{Minor}|$ may indicate the number of words in the minor class, and $P(word_{i=minor})$ may indicate a probability that a specific word belongs to the minor class.

$P(word_{i=minor})$ may be expressed by Equation 2 below.

$$\frac{|word_i = \text{minor}|}{|word_i|} \qquad [\text{Equation 2}]$$

where, $|Word_i=\text{minor}|$ may indicate the number of times in which $word_i$ is labeled with the minor class in the database 232.

Labeling the word with the minor class may mean that words <government's>, <year>, <rain> and <Monday> which are used as criteria used to determine the count of the IP class which is the minor class are classed into the IP class, in FIGS. 6 and 7.

$|word_i|$ may indicate the number of times in which $word_i$ appears in the database 232.

That is, $|word_i|$ may indicate the number of times in which $word_i$ appears in a plurality of sentences of the database 232.

The processor 260 of the speech synthesis server 30 stores the determined number of times of oversampling in the database 232 (S905).

The processor 260 may generate sentences including the words, the number of which correspond to the determined number of times of oversampling the word.

The processor 260 may label the word with the IP class and generate sentences including the word labeled with reading break of 3 such that the number of sentences corresponds to the number of times of oversampling.

The processor 260 may learn the synthesized speech model using the sentences including the word and the labeling data of labeling the word with reading break.

Figure 12:
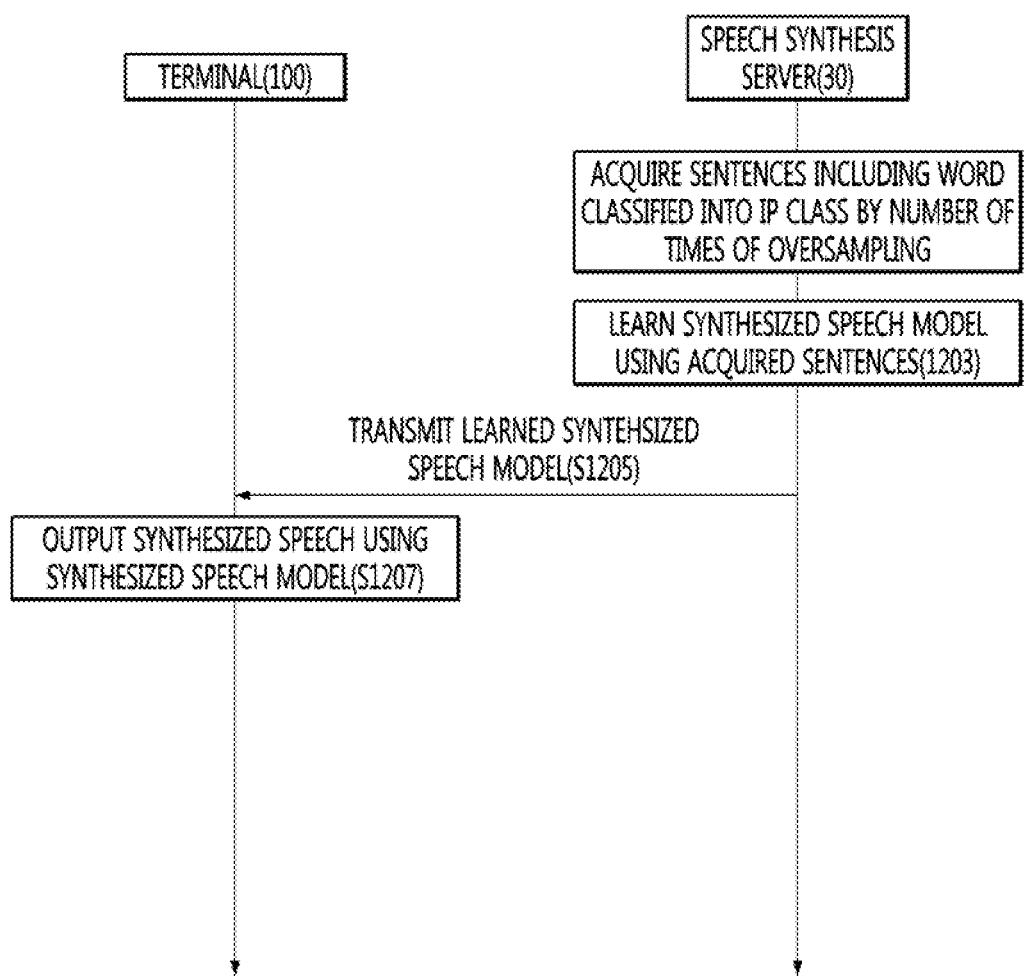
FIG. 12 is a ladder diagram illustrating a method of operating a system according to an embodiment of the present invention.

FIG. 12 is a ladder diagram illustrating a method of operating a system according to an embodiment of the present invention.

Referring to FIG. 12, the speech synthesis server 30 acquires sentences including the word classified into the IP class by the number of times of oversampling of the word (S1201).

The speech synthesis server 30 may generate arbitrary sentences including the word.

The arbitrary sentences may be training data for learning of the synthesized speech model.

The speech synthesis server 30 learns the synthesized speech model using the acquired sentences (S1203).

The word classified into the IP class may be labeled with reading break of 3.

The speech synthesis server 30 may learn the synthesized speech model using the arbitrary sentences (training data) and the labeling data of labeling the word in the arbitrary sentences with the reading break.

In one embodiment, the processor 260 of the speech synthesis server 30 may learn the synthesized speech model using a recurrent neural network (RNN).

The recurrent neural network is a kind of artificial neural network in which a hidden layer is connected to a directional edge to form a recurrent structure.

A process of learning the synthesized speech model using the recurrent neural network will be described with reference to FIG. 13.

Figure 13:
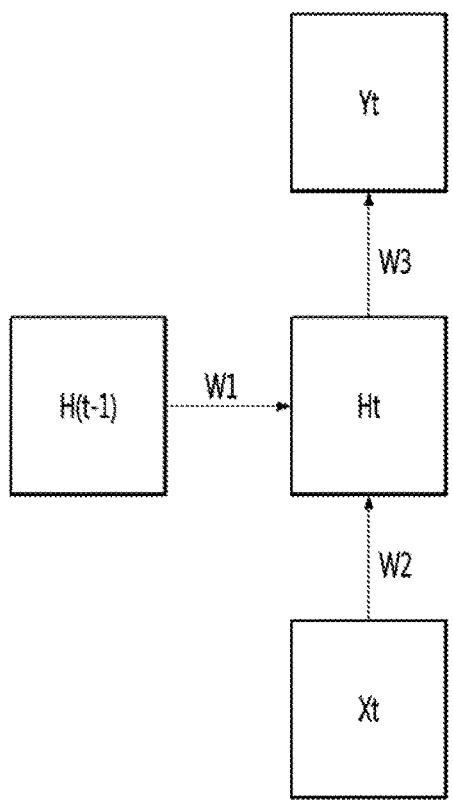
FIG. 13 is a view illustrating a basic structure of a recurrent neural network.

FIG. 13 is a view illustrating a basic structure of a recurrent neural network.

Xt denotes input data, Ht denotes current hidden data, H(t−1) denotes previous hidden data, and Yt denotes output data.

The input data, the hidden data and the output data may be expressed by feature vectors.

Parameters learned by the RNN include a first parameter W1 for converting the previous hidden data into the current hidden data, a second parameter W2 for converting the input data into the hidden data and a third parameter W3 for converting the current hidden data into the output data.

The first, second and third parameters W1, W2 and W3 may be expressed by a matrix.

According to the present invention, the input data may be a feature vector indicating a word, and the output data may be a feature vector indicating a first probability that an input word belongs to a WP class, a second probability that the input word belongs to an AP class and a third probability that the input word belongs to an IP class.

The previous hidden data may be hidden data of a previously input word, and the current hidden data may be data generated using the hidden data of the previously input word and a feature vector of a currently input word.

Figure 14:
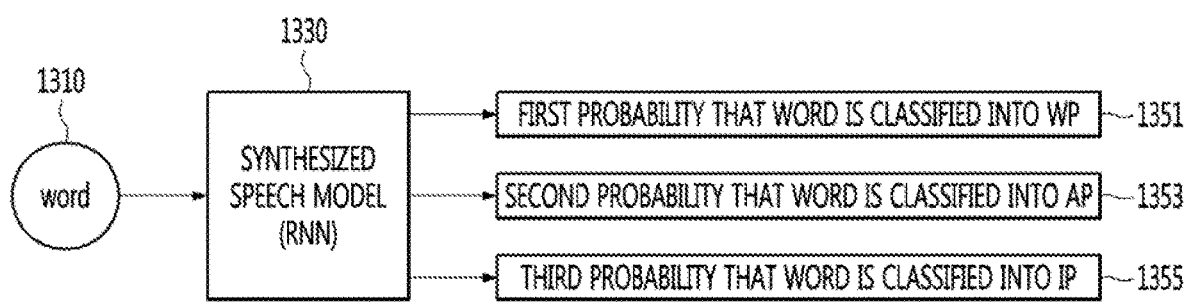
FIG. 14 is a view illustrating a process of classifying words configuring a sentence into classes using a synthesized speech model according to an embodiment of the present invention.

FIG. 14 is a view illustrating a process of classifying words configuring a sentence into classes using a synthesized speech model according to an embodiment of the present invention.

Referring to FIG. 14, a plurality of words 1310 configuring one sentence is sequentially input to the synthesized speech model 1330.

The terminal 100 or the speech synthesis server 30 may output a first probability that each of the sequentially input words 1310 is classified into the WP class, a second probability that each of the sequentially input words 1310 is classified into the AP class and a third probability that each of the sequentially input words 1310 is classified into the IP class, using the synthesized speech model 1330.

The terminal 100 or the speech synthesis server 30 may classify a probability having the largest value among the first to third probabilities into the class of the input word.

FIG. 12 will be described again.

The speech synthesis server 30 transmits the learned synthesized speech model to the terminal 100 (S1205).

The terminal 100 outputs the synthesized speech according to the request of the user through the audio output unit 152 using the synthesized speech model received from the speech synthesis server 30 (S1207).

The request of the user may be the speech command of the user, such as <Read news article>.

The terminal 100 may receive the speech command of the user and grasp the intention of the received speech command.

The terminal 100 may output, through the audio output unit 152, the synthesized speech of the text corresponding to the news article suiting the grasped intention using the synthesized speech model.

Figures 15, 16, 17:
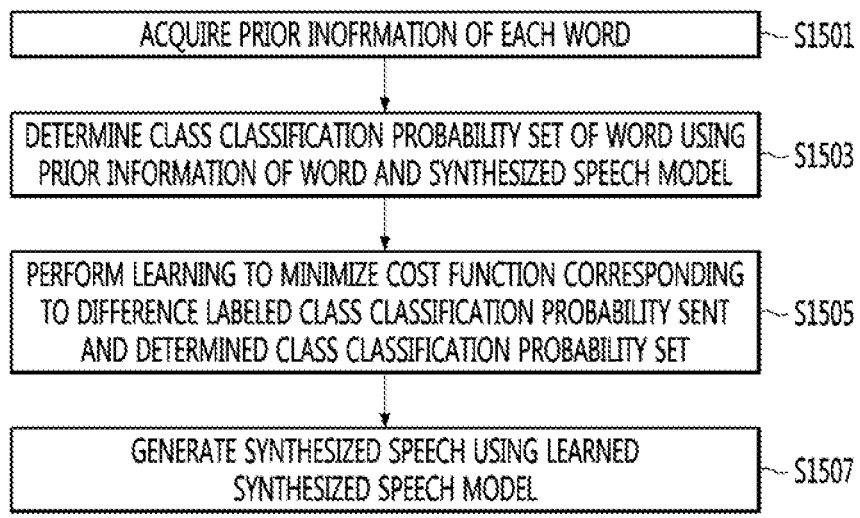
FIG. 15 is a flowchart illustrating a method of operating a speech synthesis server using artificial intelligence according to another embodiment of the present invention.
FIGS. 16 and 17 are diagrams illustrating prior information of each word stored in a database according to an embodiment of the present invention.

FIG. 15 is a flowchart illustrating a method of operating a speech synthesis server using artificial intelligence according to another embodiment of the present invention.

Referring to FIG. 15, the processor 260 of the speech synthesis server 30 acquires prior information of each of a plurality of words stored in the database 232 (S1501).

Hereinafter, assume that the minor class is the intonation phrase class of FIG. 7.

A word belonging to (or being classified into) the intonation phrase class means that a word located before <//> indicating reading break of 3, such as <government's> shown in FIG. 6, belongs to the intonation phrase class.

In one embodiment, the prior information may include one or more of an intonation phrase (hereinafter referred to as IP) ratio of a word, an IP frequency number, a non-IP ratio in which the word does not belong to the intonation phrase class (hereinafter referred to as a non-IP ratio), a non-IP frequency number, or a ratio of the non-IP frequency number to the IP frequency number.

The IP ratio may indicate a ratio in which a word is classified into the IP class, in the database 232. Specifically, in 10000 sentences in the database 232, when the number of times of classifying a first word into an IP class is 100, the IP ratio of the first word may be 1% (100/10000×100).

The ratio in which the word does not belong to the intonation phrase class (hereinafter referred to as a non-IP ratio) may be a sum of a ratio in which the word is classified into the word phrase class (hereinafter referred to as a WP ratio) and a ratio in which the word is classified into the accentual phrase class (hereinafter referred to as an AP ratio).

The prior information may further include the WP ratio and the AP ratio of the word.

Meanwhile, the prior information may further include a part-of-speech of a word, the position of a word in one sentence, the number of phonemes configuring a word, and a relation between words adjacent to each other in one sentence.

FIGS. 16 and 17 are diagrams illustrating prior information of each word stored in a database according to an embodiment of the present invention.

FIG. 16 shows an IP table 1600 showing an IP ratio in which each word is classified into the IP class and a non-IP ratio in which each word is not classified into the IP class.

The IP table 1600 shows the IP ratio which is the ratio in which each word is classified into the IP class in the sentences stored in the database 232 and the non-IP ratio obtained by subtracting the IP ratio from 1, with respect to each of the plurality of words.

The non-IP ratio may be a sum of the ratio in which the word is classified into the WP class and the ratio in which the word is classified into the AP class.

For example, the IP ratio of the word "Because" is 0.84 and the non-IP ratio thereof is 0.16 (1-0.84).

In addition, the IP ratio of the word "This" is 0.15 and the non-IP ratio thereof is 0.85.

FIG. 17 shows a class ratio table 1700 showing an IP ratio in which each word stored in the database 232 is classified into the IP class, a WP ratio in which each word is classified into the WP class and an AP ratio in which each word is classified into the AP ratio.

For example, the non-IP ratio of the word "Because" is 0.16 and may be a sum of the WP ratio (0.1) and the AP ratio (0.06).

In addition, the non-IP ratio of the word "This" is 0.85 and may be a sum of the WP ratio (0.7) and the AP ratio (0.15).

The IP table 1600 of FIG. 16 or the class ratio table 1700 of FIG. 17 may be used as the input data of the synthesized speech model.

FIG. 15 will be described again.

The processor 260 of the speech synthesis server 30 determines a second class classification probability set using the prior information of each word, a labeled first class classification probability set and a synthesized speech model.

The synthesized speech model may be an artificial neural network based model learned by a machine learning algorithm or a deep learning algorithm.

A process of determining a class classification probability set using the synthesized speech model will be described with reference to FIGS. 18 and 19.

Figure 18:
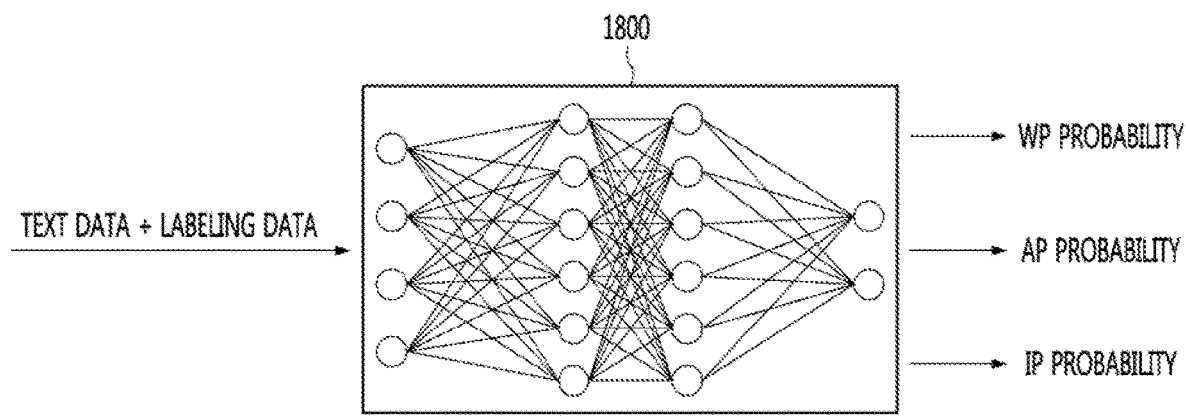
FIG. 18 is a diagram illustrating an example of a synthesized speech model which does not use an IP ratio as input data.
Figure 19:
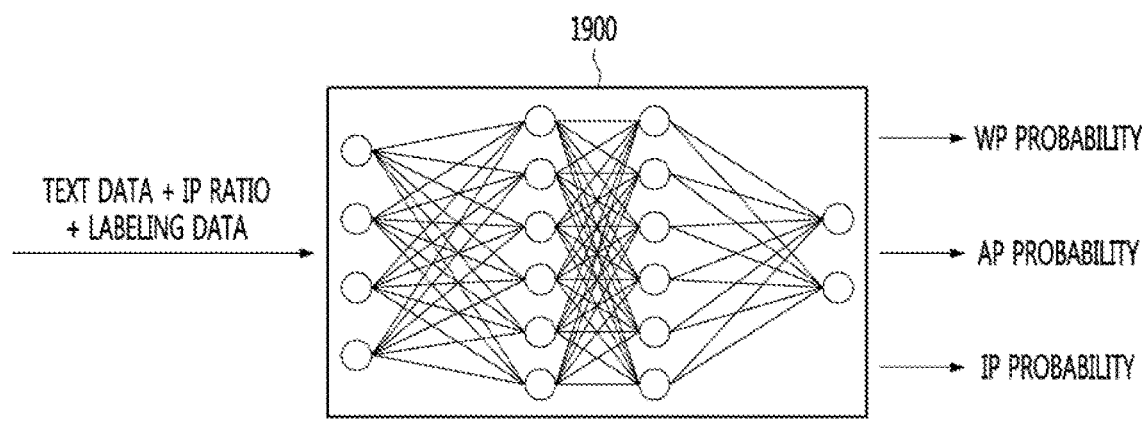
FIG. 19 is a diagram illustrating an example of a synthesized speech model which uses an IP ratio as IP ratio.

FIG. 18 is a diagram illustrating an example of a synthesized speech model which does not use an IP ratio as input data, and FIG. 19 is a diagram illustrating an example of a synthesized speech model which uses an IP ratio as IP ratio.

First, FIG. 18 will be described.

The first class classification probability set used as labeling data may include a WP probability that the word is classified into the WP class, an AP probability that the word is classified into the AP class and an IP probability that the word is classified into the IP class.

The WP probability may indicate a probability of reading a word with break of 1 within one sentence.

The AP probability may indicate a probability of reading a word with break of 2 within one sentence.

The IP probability may indicate a probability of reading a word with break of 3 within one sentence.

The processor 260 may infer a probability that each word is classified into the WP class, a probability that each word is classified into the AP class and a probability that each word is classified into the IP class, using the synthesized speech model.

The synthesized speech model may be a model composed of an artificial neural network learned to infer a class classification probability set indicating the output feature point of each word using a sentence including a plurality of words as input data.

For example, the synthesized speech model may be learned through supervised learning. Specifically, learning data used for the synthesized speech model may be labeled with the probability that the word is classified into the WP class, the probability that the word is classified into the AP class and the probability that the word is classified into the IP class.

The synthesized speech model may be learned using the labeled learning data.

The synthesized speech model may be learned with the goal of accurately inferring the probability that the word included in text data is classified into the labeled WP class, the probability that the word included in text data is classified into the AP class and the probability that the word included in text data is classified into the IP class, from text data for learning.

The cost function of the synthesized speech model may be expressed by a squared mean of a difference between each class probability corresponding to each learning data and each class probability inferred from learning data.

Through learning of the synthesized speech model, model parameters included in the artificial neural network may be determined to minimize the value of the cost function.

In FIG. 18, the first class classification probability set (labeling data), with which the text data is labeled, may be input to the synthesized speech model 1800.

In FIG. 19, the text data of the word and the IP ratio of each word may be labeled with the first class classification probability set (the labeling data) and input to the synthesized speech model 1900 as one training set.

The synthesized speech model 1900 may infer the second class classification probability set based on the training set.

The synthesized speech model 1900 may be learned, such that the class classification probability set of the word which is the result of inference is output as a target feature vector and a cost function corresponding to a difference between the output class classification probability set and the labeled class classification probability set is minimized, when an input feature vector is extracted from the text data and the IP ratio and input to the synthesized speech model.

Specifically, the synthesized speech model 1900 may be learned to minimize a difference between the labeled WP probability and the inferred WP probability, a difference between the labeled AP probability and the inferred AP probability and a difference between the labeled IP probability and the inferred IP probability.

The output result of the synthesized speech model 1900 may be composed of an output layer having a plurality of output nodes indicating the classification probability per class of the word.

Each of the plurality of output nodes may indicate the probability that the word is classified into the WP class, the probability that the word is classified into the AP class and the probability that the word is classified into the IP class.

Each of the plurality of output nodes may be expressed by a target feature vector such as (0.3, 0.3, 0.4). Each of the values of the elements configuring the target feature vector may have a value of 0 to 1.

The processor 260 may determine model parameters included in the synthesized speech model to minimize the value of the cost function expressed by the squared mean of the difference between the labeled first class classification probability set and the inferred second class classification probability set.

In another example, the text data, the IP ratio of the word, the WP ratio of the word and the AP ratio of the word may be labeled with the first class classification probability set and input to the synthesized speech model 1900 as one training set.

In another example, the text data, the IP ratio of the word, the part-of-speech of the word, the position of the word in the sentence, the number of phonemes of the word and the relation between words adjacent to each other may be labeled with the first class classification probability set and input to the synthesized speech model 1900 as one training set.

In another example, the text data, the IP ratio of the word and the non-IP ratio of the word may be labeled with the second class classification probability set and input to the synthesized speech model 1900 as one training set.

As in the embodiment of the present invention, when the synthesized speech model is learned using the IP ratio of the word as a learning feature, since various breaks of each word are considered, it is possible to improve reading break prediction performance.

The processor 260 of the speech synthesis server 30 learns the synthesized speech model to minimize the cost function corresponding to the difference between the determined second class classification probability set and the labeled first class classification probability set (S1505).

The processor 260 may determine model parameters to minimize the cost function corresponding to the difference between the first class classification probability set and the inferred second class classification probability set.

Each of the model parameters may be a weighted value or bias value used for the cost function.

The processor 260 generates a synthesized speech using the learned synthesized speech model (S1507).

The processor 260 may convert text data corresponding to one sentence into a synthesized speech having a predetermined tone using the synthesized speech model.

The synthesized speech may be generated in a state of determining reading break based on the class classification probability set of each of the words configuring one sentence.

FIGS. 20 and 21 are diagrams showing an example of a class classification probability set of a word output according to the synthesized speech model of FIG. 19.

First, FIG. 20 will be described.

Referring to FIG. 20, the class classification probability set 200 of the word <Because> is shown.

The class classification probability set 2000 may be a result inferred by inputting the word <Because> and the IP ratio (0.84) of <Because> stored in the database 232 to the synthesized speech model 1900.

The class classification probability set 2000 may include the probability (0.3) that the word <Because> is classified into the WP class, the probability (0.6) that the word <Because> is classified into the AP class and the probability (0.1) that the word <Because> is classified into the IP class.

Next, FIG. 21 will be described.

The class classification probability set 2100 may be a result inferred by inputting the word <This> and the IP ratio (0.15) of <This> stored in the database 232 to the synthesized speech model 1900.

The class classification probability set 2100 may include the probability (0.3) that the word <This> is classified into the WP class, the probability (0.3) that the word <this> is classified into the AP class and the probability (0.4) that the word <this> is classified into the IP class.

According to the embodiment of the present invention, as the synthesized speech model is learned using the IP ratio of the word stored in the database 232, since various breaks of each word are considered, it is possible to solve reading break class imbalance.

The present invention mentioned in the foregoing description can also be embodied as computer readable codes on a computer-readable recording medium. Examples of possible computer-readable mediums include HDD (Hard Disk Drive), SSD (Solid State Disk), SDD (Silicon Disk Drive), ROM, RAM, CD-ROM, a magnetic tape, a floppy disk, an optical data storage device, etc. The computer may include the processor 180 of the terminal.

What is claimed is:

1. A speech synthesizer using artificial intelligence, comprising:
    a memory configured to store a first ratio of a word classified into a minor class among a plurality of classes and a synthesized speech model; and
    a processor configured to determine a class classification probability set of the word using the word, the first ratio and the synthesized speech model,
    wherein the first ratio indicates a ratio in which the word is classified into the minor class within a plurality of characters,
    wherein the plurality of classes includes a first class corresponding to a first reading break, a second class corresponding to a second reading break greater than the first reading break and a third class corresponding to a third reading break greater than the second reading break, and
    wherein the minor class has a smallest count among the first to third classes.

2. The speech synthesizer according to claim 1, wherein the class classification probability set includes a probability that the word is classified into the first class, a probability that the word is classified into the second class and a probability that the word is classified into the third class.

3. The speech synthesizer according to claim 2, wherein the synthesized speech model is an artificial neural network based model learned by a machine learning algorithm or a deep learning algorithm.

4. The speech synthesizer according to claim 3, wherein the synthesized speech model is learned using a first class classification probability set, with which text data corresponding to the word and the first ratio are labeled.

5. The speech synthesizer according to claim 4, wherein the synthesized speech model is learned, such that a second class classification probability set of the word is output as a target feature vector and a cost function corresponding to a difference between the output second class classification probability set and the labeled first class classification probability set is minimized, when an input feature vector is extracted from the text data and input to the synthesized speech model.

6. The speech synthesizer according to claim 5, wherein the processor learns the synthesized speech model to minimize a difference between a probability that the word is classified into the labeled first class and a probability that the word is classified into the inferred first class, a difference between a probability that the word is classified into the labeled second class and a probability that the word is classified into the inferred second class and a difference between a probability that the word is classified into the labeled third class and a probability that the word is classified into the inferred third class.

7. The speech synthesizer according to claim 3, wherein the synthesized speech model is learned using the first class classification probability set, with which text data corresponding to the word, the first ratio, a second ratio in which the word is classified into the first class, and a third ratio in which the word is classified into the second class are labeled.

8. The speech synthesizer according to claim 3, wherein the synthesized speech model is learned using the first class classification probability set, with which text data corresponding to the word, the first ratio, a part-of-speech of the word, the number of phonemes of the word and a position of the word in one sentence are labeled.

9. A method of operating a speech synthesizer using artificial intelligence, the method comprising:
storing a first ratio of a word classified into a minor class among a plurality of classes and a synthesized speech model; and
determining a class classification probability set of the word using the word, the first ratio and the synthesized speech model,
wherein the first ratio indicates a ratio in which the word is classified into the minor class within a plurality of characters,
wherein the plurality of classes includes a first class corresponding to a first reading break, a second class corresponding to a second reading break greater than the first reading break and a third class corresponding to a third reading break greater than the second reading break,
wherein the minor class has a smallest count among the first to third classes, and
wherein the class classification probability set includes a probability that the word is classified into the first class, a probability that the word is classified into the second class and a probability that the word is classified into the third class.

10. The method according to claim 9,
wherein the synthesized speech model is an artificial neural network based model learned by a machine learning algorithm or a deep learning algorithm,
wherein the synthesized speech model is learned using a first class classification probability set, with which text data corresponding to the word and the first ratio are labeled.

11. The method according to claim 10, wherein the synthesized speech model is learned, such that a second class classification probability set of the word is output as a target feature vector and a cost function corresponding to a difference between the output second class classification probability set and the labeled first class classification probability set is minimized, when an input feature vector is extracted from the text data and input to the synthesized speech model.

12. The method according to claim 11, wherein the synthesized speech model is learned to minimize a difference between a probability that the word is classified into the labeled first class and a probability that the word is classified into the inferred first class, a difference between a probability that the word is classified into the labeled second class and a probability that the word is classified into the inferred second class and a difference between a probability that the word is classified into the labeled third class and a probability that the word is classified into the inferred third class.

13. The method according to claim 10, wherein the synthesized speech model is learned using the first class classification probability set, with which text data corresponding to the word, the first ratio, a second ratio in which the word is classified into the first class, and a third ratio in which the word is classified into the second class are labeled.

14. The method according to claim 10, wherein the synthesized speech model is learned using the first class classification probability set, with which text data corresponding to the word, the first ratio, a part-of-speech of the word, the number of phonemes of the word and a position of the word in one sentence are labeled.

15. A non-transitory computer-readable recording medium for performing a method of operating a speech synthesizer, the method comprising:
storing a first ratio of a word classified into a minor class among a plurality of classes and a synthesized speech model; and
determining a class classification probability set of the word using the word, the first ratio and the synthesized speech model,
wherein the plurality of classes includes a first class corresponding to a first reading break, a second class corresponding to a second reading break greater than the first reading break and a third class corresponding to a third reading break greater than the second reading break,
wherein the minor class has a smallest count among the first to third classes, and
wherein the class classification probability set includes a probability that the word is classified into the first class, a probability that the word is classified into the second class and a probability that the word is classified into the third class.

* * * * *